United States Patent
Hiscox

[11] 3,900,228
[45] Aug. 19, 1975

[54] WHEEL SLIDE PROTECTION SYSTEM

[75] Inventor: Leonard Ramsey Hiscox, Birmingham, England

[73] Assignee: Girling Limited, Birmingham, England

[22] Filed: July 18, 1973

[21] Appl. No.: 380,225

[30] Foreign Application Priority Data
July 18, 1972 United Kingdom............ 33514/72
July 18, 1972 United Kingdom............ 33515/72

[52] U.S. Cl. ...................... 303/21 CG; 188/181 A
[51] Int. Cl. ............................................ B60t 8/12
[58] Field of Search .......... 188/181 A; 303/20, 21; 317/5; 324/162; 340/53, 262

[56] References Cited
UNITED STATES PATENTS

| | | |
|---|---|---|
| 3,494,671 | 2/1970 | Slavin et al...................... 303/21 P |
| 3,598,452 | 8/1971 | Clifford et al.................. 303/21 CG |
| 3,659,904 | 5/1972 | Stevens.......................... 303/21 CG |
| 3,757,166 | 9/1973 | Clifford et al. ...................... 317/5 |
| 3,776,355 | 12/1973 | Scherenberg...................... 180/77 R |
| 3,822,921 | 7/1974 | Jones.............................. 303/21 BE |

*Primary Examiner*—Trygve M. Blix
*Assistant Examiner*—Stephen G. Kunin
*Attorney, Agent, or Firm*—Holman & Stern

[57] ABSTRACT

A wheel slide protection system particularly for a rail vehicle releases the brakes from a wheel of the rail vehicle when the deceleration of the wheel exceeds a predetermined value. The system is rendered inoperative in use when the wheel speed is below a predetermined value. Preferably, an alternator is driven by the wheel and used to produce the deceleration signal and the power for the system is derived from a battery charged by the alternator and which is disconnected from the circuit when the circuit is inoperative.

8 Claims, 1 Drawing Figure

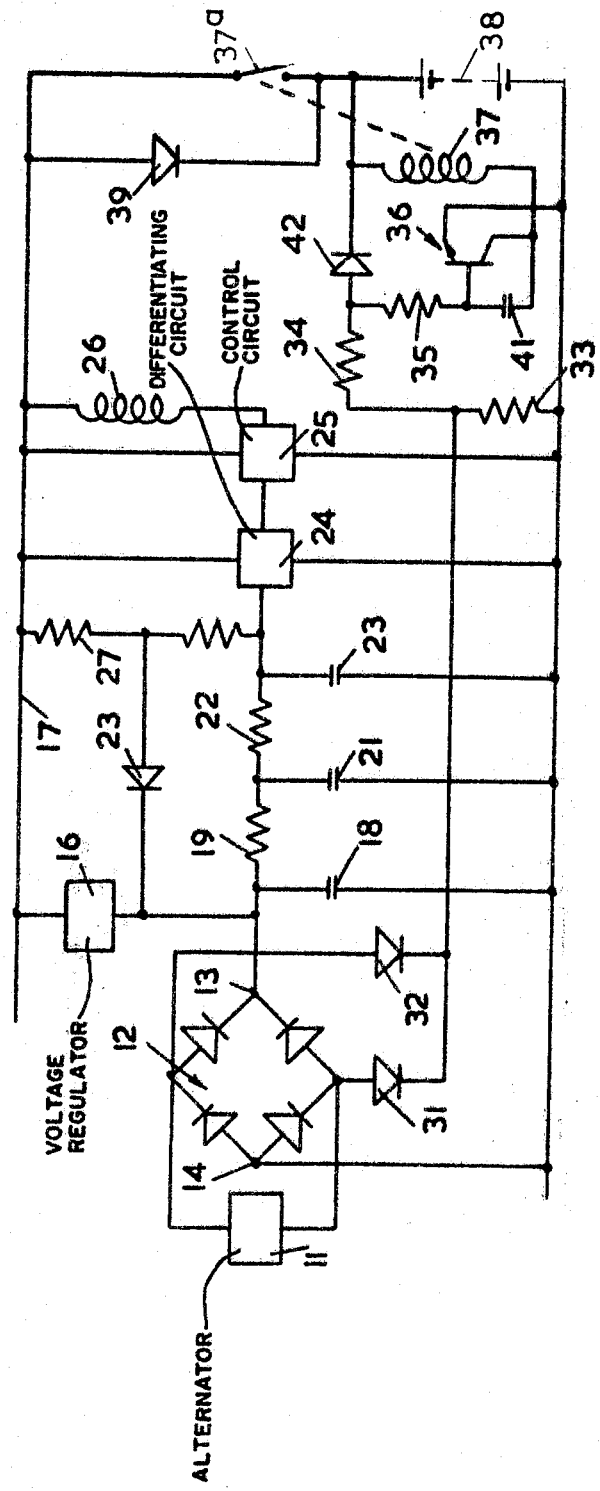

WHEEL SLIDE PROTECTION SYSTEM

This invention relates to wheel slide protection systems for vehicles, particularly, but not exclusively, rail vehicles.

A system according to one aspect of the invention comprises means operable in use to produce a signal representing the rotational speed of a wheel, a differentiating circuit to which said signal is applied, the differentiating circuit producing an output dependent upon the rotational deceleration of the wheel, control means coupled to the differentiating circuit and operable in use to release the brakes from the wheel when said deceleration exceeds a predetermined value, and means for rendering the system inoperative in use when the wheel speed is below a predetermined value.

Preferably, the system is rendered inoperative by clamping the input of the differentiating circuit below a predetermined wheel speed.

In the preferred arrangement, the system includes an alternator which is driven in use by the wheel, the output of the alternator being rectified and applied to the differentiating circuit, and the clamping of the differentiating circuit being provided by a resistance chain connected across the alternator output, a point on the resistance chain being connected to the input terminal of the differentiating circuit through a diode which is non-conductive until the rotational speed of the wheel is below the predetermined value.

A system according to another aspect of the invention comprises an alternator which in use is driven by a wheel to be controlled and produces an output representing the rotational speed of the wheel, a differentiating circuit to which said output is applied, the differentiating circuit producing an output representing the rotational deceleration of the wheel, and control means coupled to the differentiating circuit and adapted in use to release the brakes from said wheel when the rotational deceleration of the wheel exceeds a predetermined value, the power for the system being derived from a battery which is charged by said alternator, and the system further including switching means for disconnecting the battery from the system when the system is inoperative.

Preferably, the battery is coupled to the system through switching means which is closed only when the alternator produces an output.

Preferably, the alternator output closes a switch which allows the battery to operate a relay, the contact of which closes to connect the battery to the system. In such an arrangement the switch operated by the alternator is preferably a transistor, and moreover means is preferably provided for permitting the alternator to charge the battery with the battery disconnected from the system, so that if the battery voltage is sufficient to operate the relay, the battery is charged. Preferably, a delay circuit is provided for maintaining the battery connected for a predetermined period after the alternator stops.

In another aspect, a system as specified above controls acceleration, the differentiating circuit serving to sense the rotational acceleration and the control means being adapted in use to remove power from an accelerating wheel which is about to slip.

The accompanying drawing is a circuit diagram illustrating one example of the invention as applied to a braking system for a rail vehicle.

Referring to the drawing the wheel of a rail vehicle drives an alternator 11 which provides an input to a full wave rectifier 12 having positive and negative output terminals 13, 14. The terminal 14 is connected to a negative supply line 15, and the terminal 13 is connected through a voltage regulator of any convenient form 16 to a positive supply line 17. The terminal 13 is further connected through a capacitor 18 to the line 15, and the capacitor 18 is bridged by a resistor 19 and a capacitor 21 in series, the junction of the resistor 19 and capacitor 21 being connected to the line 15 through a resistor 22 and a capacitor 23 in series. The junction of the resistor 22 and capacitor 23 is connected to the input terminal of a differentiating circuit 24 connected between the lines 17, 15, and the differentiating circuit 24 provides an input to a control circuit 25 connected between the lines 17, 15 and providing an output to a winding 26 which, when it is energised, removes the brakes from the wheel.

The input terminals of the rectifier 12 are further connected to the anodes of a pair of diodes 31, 32 having their cathodes connected through a resistor 33 to the line 15, and through resistors 34, 35 in series to the base of an n-p-n transistor 36 having its emitter connected to the line 15 and its collector connected through a relay winding 37 to the positive terminal of a rechargeable nickel-cadmium battery 38, the negative terminal of which is connected to the line 15, the positive terminal of which is connected to the line 17 through a normally open contact 37a operated by the winding 37. The contact 37a is bridged by a diode 39, the collector and base of the transistor 36 are bridged by a capacitor 41, and the junction of the resistors 34, 35 is connected through a diode 42 to the positive terminal of the battery 38. Moreover, the lines 17, 15 are bridged by a pair of resistors 27, 28 in series and the junction of the resistors 27, 28 is connected through a diode 29 to the terminal 13.

In the rest condition of the wheel, the alternator 11 does not produce an output, and so no current flows to the base of the transistor 36, so that the winding 37 is de-energised and the contact 37a is open. In this condition, no current flows in any part of the circuit.

Ignoring for the moment the diode 29, when the wheel starts to rotate, the diodes 31 and 32 provide a rectified supply to the base of the transistor 36 to turn it on, so that current can flow from the battery 38 through the winding 37 and the collector-emitter of the transistor 36 to energise the winding 37 and close the contact 37a, so that the battery 38 is connected between the lines 17, 15. If for any reason the battery 38 is discharged to a level such that it cannot energise the winding 37, then the battery 38 is charged before the contact 37a closes by way of the diode 39, and also by way of the diode 42.

The alternator 12 provides an a.c. signal having an amplitude dependent upon the rotational speed of the wheel, and this signal is smoothed by the resistor-capacitor network 18, 19, 21, 22, 23 and applied to the differentiating circuit 24, which produces an output representing the rotational deceleration of the wheel. If the deceleration of the wheel reaches a predetermined level, which is chosen to be a level such that wheel slip is about to occur, then the control circuit 25 produces an output to energise the winding 26 and remove the brakes from the wheel.

When the wheel stops, the alternator 12 no longer produces an output, and the transistor 36 turns off. As a result, the contact 37a opens, so preventing discharge of the battery 38. However, there is a delay before the contact 37a opens by virtue of the capacitor 41, so that a momentary wheel lock does not cause battery disconnection.

Considering now the diode 29, as long as the rotational speed of the wheel is above a low value, equivalent for example to approximately 5 m.p.h., then the potential at the terminal 13 is in excess of the potential at the junction of the resistors 27 and 28, and so the diode 29 is reverse biased. However, when the rotational speed of the wheel falls to a predetermined value, then current flows through the diode 29 to maintain the terminal 13 at a predetermined potential. Since the potential at the terminal 13 is now fixed, there is no change in the input voltage to the differentiating circuit 24, and so the differentiating circuit 24 cannot produce an output, since it responds only to changes in its input voltage. As a result, the system is rendered inoperative below the predetermined speed.

It will of course be appreciated that since the unit is entirely self-powered, it is particularly suitable for rail vehicles. Moreover, since the battery 38 is disconnected from the lines 17, 15 when the wheel is not rotating, the risk of the battery 38 being discharged through sneak paths in the circuit when a vehicle is not used for a substantial period of time is minimised.

In the preferred arrangement, the control circuit 25 includes a Schmitt trigger circuit which switches when the predetermined deceleration is attained, and operates an amplifier which energises the winding 26.

The circuit can also control acceleration, either as well as, or instead of deceleration. For this purpose, the differentiating circuit produces an output representing rotational acceleration, and when this output reaches a predetermined level, then the control circuit operates means for removing power from the wheel.

I claim:

1. A wheel slide protection system for a vehicle, comprising means operable in use to produce a signal representing a rotational speed of a wheel, a differentiating circuit to which said signal is applied, the differentiating circuit producing an output dependent upon the rotational deceleration of the wheel, control means coupled to the differentiating circuit and operable in use to release the brakes from the wheel when said deceleration exceeds a predetermined value, and means operable when the wheel speed is below a predetermined value for rendering the system inoperative by clamping the input of the differentiating circuit.

2. A system as claimed in claim 1 including an alternator which is driven in use by the wheel, the output of the alternator being rectified and applied to the differentiating circuit, and the clamping of the differentiating circuit being provided by a resistance chain connected across the alternator output, a point on the resistance chain being connected to the input terminal of the differentiating circuit through a diode which is non-conductive until the rotational speed of the wheel is below the predetermined value.

3. A system as claimed in claim 2 in which the power for the system is derived from a battery charged by said alternator, and switching means is provided for disconnecting the battery from the system when the system is inoperative.

4. A wheel slide protection system for a vehicle, comprising an alternator which in use is driven by a wheel to be controlled and produces an output representing the rotational speed of the wheel, a differentiating circuit to which said output is applied, the differentiating circuit producing an output representing the rotational deceleration of the wheel, and control means coupled to the differentiating circuit and adapted in use to release the brakes from said wheel when the rotational deceleration of the wheel exceeds a predetermined value, the power for the system being derived from a battery which is charged by said alternator, and the system further including switching means for disconnecting the battery from the system when the system is inoperative, together with delay means for maintaining the battery connected for a predetermined period of time after the alternator stops.

5. A system as claimed in claim 4 in which the battery is coupled to the system through switching means which is closed only when the alternator produces an output.

6. A system as claimed in claim 5 in which the alternator output closes a switch which allows the battery to operate a relay, the contact of which closes to connect the battery in the system.

7. A system as claimed in claim 6 in which the switch operated by the alternator is a transistor.

8. A system as claimed in claim 6 in which means is provided for permitting the alternator to charge the battery with the battery disconnected from the system, so that if the battery voltage is insufficient to operate the relay the battery is charged.

* * * * *